(12) United States Patent
Nakata et al.

(10) Patent No.: US 11,997,996 B2
(45) Date of Patent: Jun. 4, 2024

(54) SPOOL BRAKING DEVICE FOR DUAL BEARING REEL

(71) Applicant: Shimano Inc., Sakai (JP)

(72) Inventors: Daichi Nakata, Sakai (JP); Hiroki Oogose, Sakai (JP); Kunio Takechi, Sakai (JP); Kouhei Nakamura, Sakai (JP); Keigo Kitajima, Sakai (JP)

(73) Assignee: Shimano Inc., Sakai (JP)

( * ) Notice: Subject to any disclaimer, the term of this patent is extended or adjusted under 35 U.S.C. 154(b) by 0 days.

(21) Appl. No.: 17/897,532

(22) Filed: Aug. 29, 2022

(65) Prior Publication Data
US 2023/0157268 A1  May 25, 2023

(30) Foreign Application Priority Data

Nov. 24, 2021 (JP) ................................. 2021-190084
Apr. 26, 2022 (JP) ................................. 2022-072573

(51) Int. Cl.
*A01K 89/0155* (2006.01)

(52) U.S. Cl.
CPC ................................. *A01K 89/0155* (2013.01)

(58) Field of Classification Search
CPC .......... A01K 89/0155; A01K 89/01557; A01K 89/033; A01K 89/02; A01K 89/045; A01K 89/047; A01K 89/057; A01K 89/058; A01K 89/0186; A01K 89/0187; A01K 89/0188; A01K 89/01903; A01K 89/01909; F16D 11/14; F16D 23/02
USPC ....................................................... 242/289
See application file for complete search history.

(56) References Cited

U.S. PATENT DOCUMENTS

| | | | | |
|---|---|---|---|---|
| 4,830,308 A | * | 5/1989 | Puryear | A01K 89/01555 242/288 |
| 6,196,485 B1 | * | 3/2001 | Sato | A01K 89/01557 242/289 |
| 7,618,003 B2 | * | 11/2009 | Rho | A01K 89/01555 188/181 A |
| 9,826,726 B2 | * | 11/2017 | Ikebukuro | F16D 7/044 |
| 2005/0178869 A1 | * | 8/2005 | Hyun | A01K 89/01555 242/288 |

(Continued)

FOREIGN PATENT DOCUMENTS

JP    2016-202123 A    12/2016

*Primary Examiner* — Michael R Mansen
*Assistant Examiner* — Henrix Soto
(74) *Attorney, Agent, or Firm* — United IP Counselors, LLC

(57) ABSTRACT

A spool braking device includes a brake drum and a rotation structure. The brake drum is disposed in a reel body and positioned alongside a spool in an axial direction. The rotation structure is arranged between the spool and the brake drum in the axial direction. The rotation structure has a support, a brake shoe, and a biasing member. The support rotates in accordance with a spool shaft. The brake shoe has a center of gravity arranged outside of the brake drum in a radial direction. The brake shoe is configured to contact a tapered surface of the brake drum. The biasing member biases one of the support or the brake drum towards another one of the support or the brake drum. The one of the support or the brake drum is movable in the axial direction with respect to the another one of the support or the brake drum.

10 Claims, 9 Drawing Sheets

(56) References Cited

U.S. PATENT DOCUMENTS

| | | | |
|---|---|---|---|
| 2006/0138267 A1* | 6/2006 | Ikuta | A01K 89/033 |
| | | | 242/245 |
| 2012/0318902 A1* | 12/2012 | Kawabe | A01K 89/057 |
| | | | 242/298 |
| 2019/0364865 A1* | 12/2019 | Hyun | A01K 89/01931 |
| 2020/0236918 A1* | 7/2020 | Hyun | A01K 89/01555 |
| 2020/0305401 A1* | 10/2020 | Hyun | A01K 89/01555 |

* cited by examiner

SPOOL BRAKING DEVICE FOR DUAL BEARING REEL

CROSS-REFERENCE TO RELATED APPLICATIONS

This application claims priority to Japanese Patent Application No. 2021-190084, filed Nov. 24, 2021, and Japanese Patent Application No. 2022-072573, filed Apr. 26, 2022. The contents of those applications are incorporated by reference herein in their entireties.

TECHNICAL FIELD

The present invention relates to a spool braking device for a dual bearing reel.

BACKGROUND ART

Some dual bearing reels are equipped with a spool braking device that uses centrifugal force to brake the rotation of a spool (see Japanese Laid-Open Patent Application No. 2016-202123). A spool and a rotary member are attached to a spool shaft in a spool braking device. Brake shoes are attached to the rotary member in a swingable manner. The brake shoes swing with a brake drum in accordance with the rotation of the spool via the rotary member.

In a conventional spool braking device, when a spool and a rotary member rotate with a spool shaft, centrifugal force proportional to the square of the rotational speed of the rotary member acts on brake shoes, and frictional force is generated between the brake shoes and the brake drum. In other words, the greater the rotational speed of the spool and the rotary member, the more the braking force on the spool increases.

Therefore, if the braking force on the spool suddenly becomes too large when the rotational speed of the spool and the rotary member is high, the flying distance may decrease. Also, when the rotational speed of the spool and the rotary member decreases from the state in which the rotational speed of the spool and the rotary member is high, the frictional force suddenly becomes small and the braking force on the spool may become too small. In this case, there is a likelihood that backlash occurs.

BRIEF SUMMARY

The object of the present invention is to provide a spool braking device for a dual bearing reel, that is configured to apply a suitable braking force to a spool.

A spool braking device for a dual bearing reel according to one aspect of the present invention brakes a spool, rotating integrally with a spool shaft that is rotatably supported by a reel body, using centrifugal force.

The spool braking device includes a brake drum and a rotation structure. The brake drum is disposed in the reel body. The brake drum is positioned alongside the spool in an axial direction in which a rotation axial center of the spool shaft extends. The brake drum has a tapered surface, whose diameter is reduced towards the spool, on an outer peripheral surface thereof.

The rotation structure is arranged between the spool and the brake drum in the axial direction. The rotation structure has a support, a brake shoe, and a biasing member. The support rotates in accordance with the spool shaft. The brake shoe is swingably supported by the support. The center of gravity of the brake shoe is positioned to be outside of the brake drum in a radial direction away from the rotation axial center. The brake shoe comes in contact with the tapered surface of the brake drum.

The biasing member biases one of the support or the brake drum towards another one of the support or the brake drum. The one of the support or the brake drum is arranged so as to be movable in the axial direction with respect to the another one of the support or the brake drum.

In the spool braking device, when the rotational speed of the spool and the support increases in a state in which the brake shoe is in contact with the tapered surface of the brake drum, the braking force of the brake shoe on the tapered surface of the brake drum increases, and the support and the brake drum are separated from each other. With this, the brake shoe comes in contact with the tapered surface at the small diameter side, and thus, the braking force on the spool can be reduced. That is, with the spool braking device according to the present invention, it is possible to solve the problem of conventional technology, such as reduction in flying distance due to the increase in the braking force on the spool.

Also, in the spool braking device according to the present invention, when the rotational speed of the spool and the support decreases from a state in which the rotational speed of the spool and the support is high, the support and the brake drum come closer to each other due to the biasing member. With this, the brake shoe comes in contact with the brake drum at the large diameter side, and thus, the braking force on the spool can be recovered. That is, with the spool braking device, it is possible to solve the problem of conventional technology, such as backlash due to the decrease in the braking force on the spool.

In the spool braking device for a dual bearing reel according to another aspect of the present invention, it is preferable that the rotation structure further includes a cam mechanism. In this case, the cam mechanism guides the support, which is axially movable with respect to the brake drum, in the axial direction away from the brake drum. The support is arranged between the cam mechanism and the biasing member in the axial direction. This configuration allows one of the support or the brake drum to be suitably moved in the axial direction with respect to another one of the support or the brake drum.

In the spool braking device for a dual bearing reel according to another aspect of the present invention, it is preferable that the cam mechanism includes a first cam section and a second cam section. In this case, the first cam section has a first body which rotates integrally with the spool shaft, and a protrusion which protrudes from the first body towards the support. The second cam section has a second body which rotates integrally with the support, and a recess disposed in the second body and engaged with the protrusion. Here, the protrusion has a pair of sloped surfaces facing each other in a circumferential direction around the rotation axial center. The circumferential interval between the pair of sloped surfaces decreases in the axial direction towards the spool.

In the spool braking device for a dual bearing reel according to another aspect of the present invention, it is preferable that the rotation structure further includes a positioning member. The positioning member is configured to position the support to an initial position. The support is movable in the axial direction with respect to the brake drum. The support is arranged between the positioning member and the biasing member in the axial direction. This configuration allows the support to be suitably positioned at the initial position.

In the spool braking device for a dual bearing reel according to another aspect of the present invention, the cam mechanism includes a first cam section and a second cam section. The first cam section has a first body which rotates integrally with a spool shaft, and a protrusion which protrudes from the first body towards the support. The second cam section has a second body which is arranged to face the first body in the axial direction and rotates integrally with the support, and a recess disposed in the second body and engaged with the protrusion. This configuration allows the cam mechanism to be suitably operated.

In the spool braking device for a dual bearing reel according to another aspect of the present invention, the cam mechanism includes a first cam section and a second cam section. The first cam section includes a first body, and a protrusion. The first body has a cylindrical part which rotates integrally with the spool shaft, and a flange which extends radially outward from the cylindrical part. The protrusion protrudes from the flange towards the support. The second cam section includes a second body, and a recess. The second body is disposed on an outer peripheral surface of the cylindrical part axially between the flange and the support, and rotates integrally with the support. The recess is disposed in the second body and engaged with the protrusion.

In this configuration, the second body of the second cam section is arranged on the outer peripheral surface of the cylindrical part axially between the flange and the support. In this state, the second cam section approaches or moves away from the first cam section on the outer peripheral surface of the cylindrical part. This allows the second cam section to be stably moved in the axial direction.

In the spool braking device for a dual bearing reel according to another aspect of the present invention, the cam mechanism includes a first cam section and a second cam section. The first cam section includes a first body which rotates integrally with the spool shaft, and a protrusion which protrudes from the first body towards the support. The second cam section includes a second body, a recess, and a boss. The second body rotates integrally with the support. The recess disposed in the second body and engaged with the protrusion. The boss protrudes from the second body. The first body has a non-circular hole which engages non-rotatably relative to an outer peripheral surface of the spool shaft, and a circular hole which communicates with the non-circular hole. The boss is arranged between the spool shaft and the circular hole in the radial direction.

In this configuration, in a state in which a tip of the boss is arranged in the circular hole of the first cam section, the second cam section approaches or moves away from the first cam section on the spool shaft. This allows the second cam section to be stably moved in the axial direction.

With a spool braking device for a dual bearing reel according to the present invention, it is possible to suitably apply braking force on a spool.

DETAILED DESCRIPTION

Figure 1:
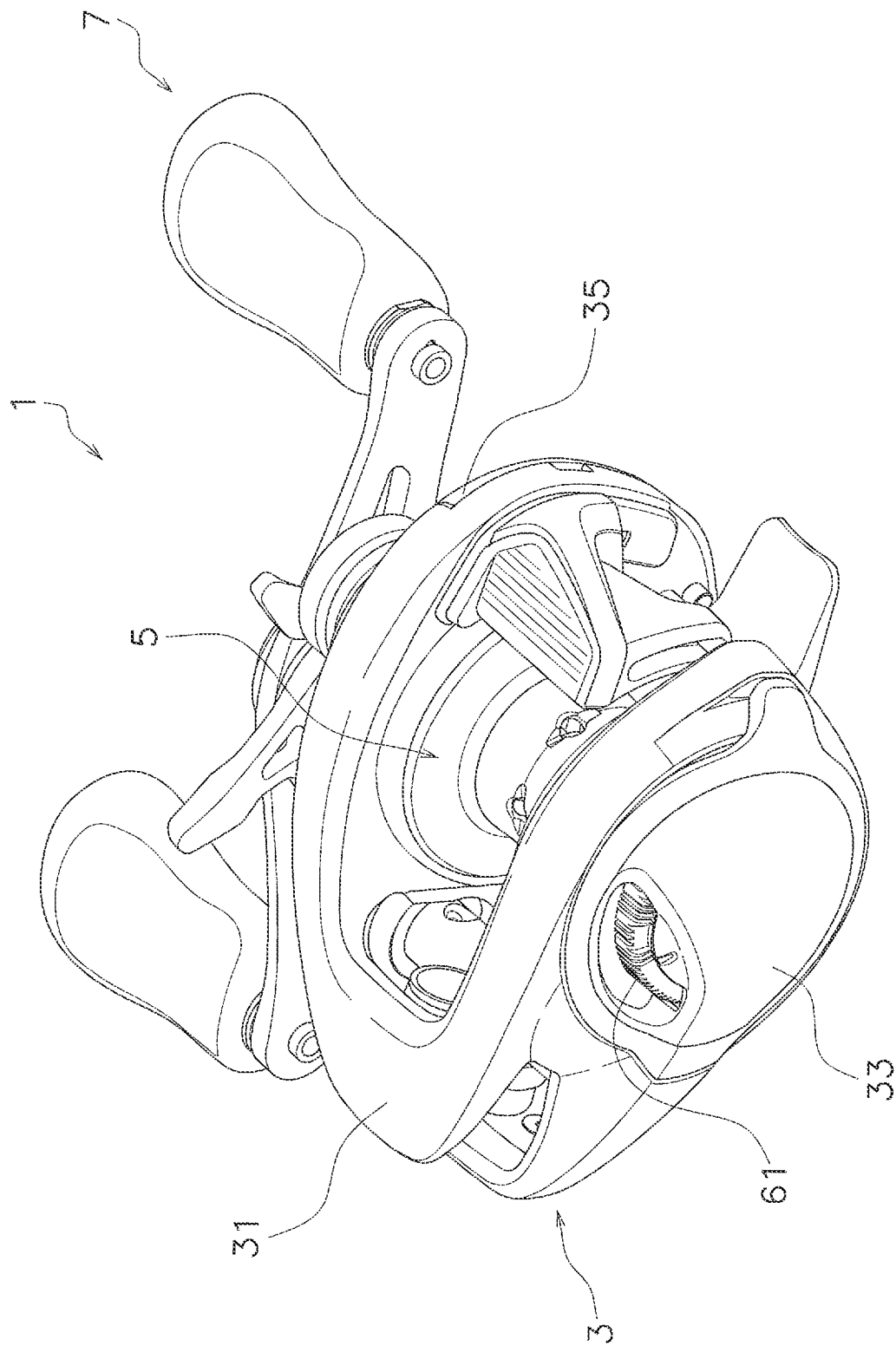
FIG. 1 is a perspective view of an external appearance of a dual bearing reel according to an embodiment of the present invention.
Figure 2:
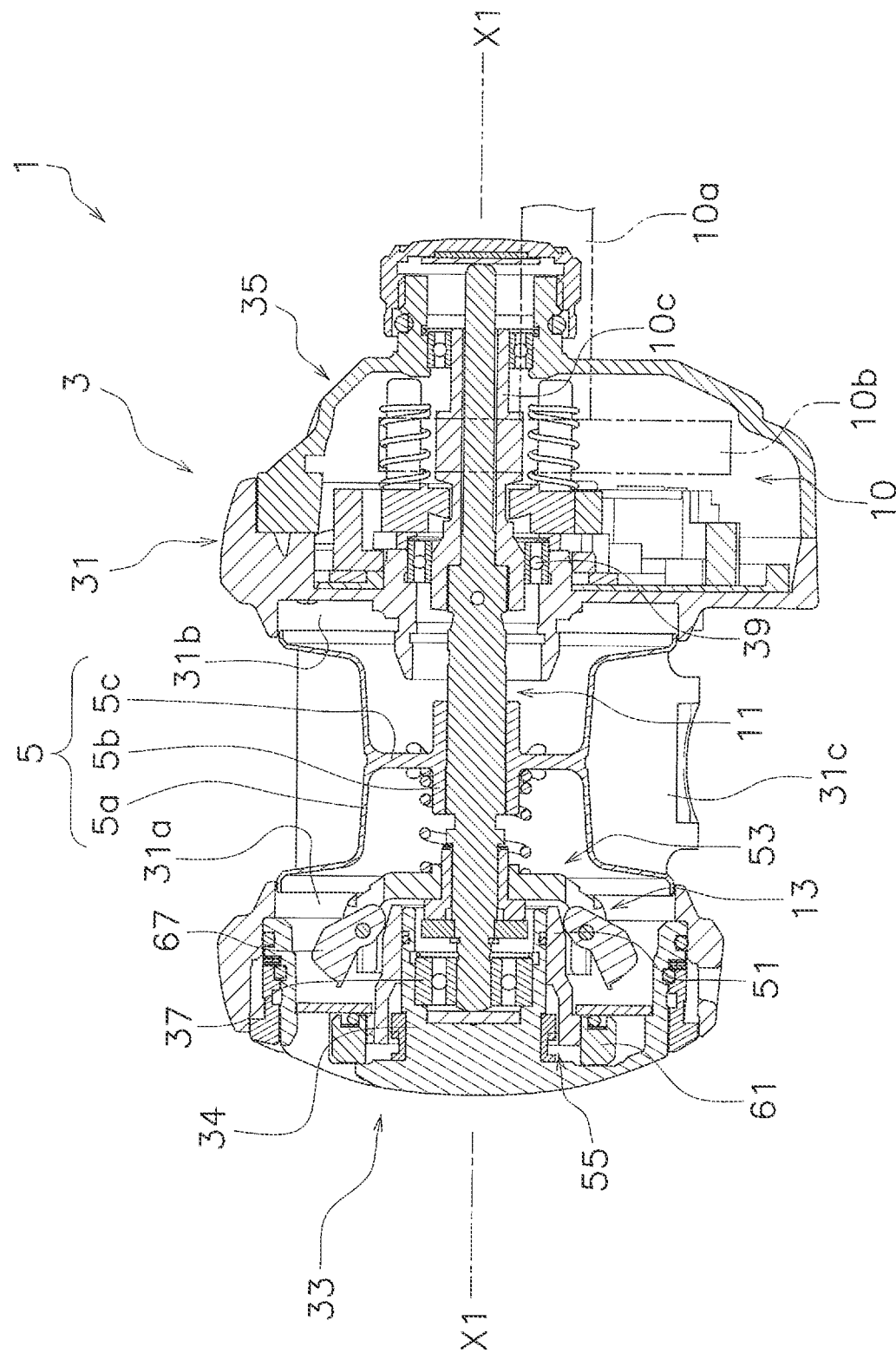
FIG. 2 is a cross-sectional view of the dual bearing reel.

As shown in FIG. 1, a dual bearing reel 1, in which one embodiment of the present invention is employed, includes a reel body 3, a spool 5, and a handle 7. As shown in FIG. 2, the dual bearing reel 1 further includes a spool shaft 11 and a spool braking device 13.

Here, the axial direction refers to the direction in which the rotation axial center X1 of the spool shaft 11 extends. The radial direction refers to the direction from which the rotation axial center X1 of the spool shaft 11 perpendicularly apart. The circumferential direction refers to the direction around the rotation axial center X1 of the spool shaft 11.

As shown in FIG. 2, the reel body 3 has a frame 31, a first side cover 33, and a second side cover 35. The frame 31 has a first side plate 31a, a second side plate 31b, and a plurality of joint sections 31c.

The first side plate 31a and the second side plate 31b are arranged so as to be spaced apart from each other in the axial direction. The first side plate 31a and the second side plate 31b are connected to each other via the plurality of joint sections 31c. The first side plate 31a, the second side plate 31b, and the plurality of joint sections 31c are integrally formed.

The first side cover 33 is attached to the frame 31. The first side cover 33 covers the first side plate 31a. For example, the first side cover 33 covers the first side plate 31a on the opposite side of the handle 7. The first side cover 33 has a cylinder-shaped shaft support 34.

The shaft support 34 is disposed outside of the spool shaft 11 in the radial direction. The shaft support 34 rotatably supports the spool shaft 11 via a bearing 37. Between the first side cover 33 and the first side plate 31a, an operating member 61 (described below) is arranged so as to axially move a brake drum 51 (described below) of the spool braking device 13.

The second side cover 35 is attached to the frame 31. The second side cover 35 covers the second side plate 31b. For example, the second side cover 35 covers the second side plate 31b between the handle 7 (see FIG. 1) and the second side plate 31b. A rotation transmission mechanism 10 for transmitting the rotation of the handle 7 to the spool 5 is arranged between the second side cover 35 and the second side plate 31b.

The spool 5 is rotatably supported by the reel body 3. For example, the spool 5 is rotatably supported by the reel body 3 via the spool shaft 11. The spool 5 has a spool body portion 5a, a boss 5b, and an annular wall portion 5c. A fishing line is wound around the spool body portion 5a. The boss 5b is attached to the spool shaft 11 so as to rotate integrally with the spool shaft 11. The annular wall portion 5c connects the spool body portion 5a and the boss 5b. For example, the annular wall portion 5c is integrally formed with the spool body portion 5a and the boss 5b.

As shown in FIG. 1, the handle 7 is rotatably attached to the reel body 3. For example, the handle 7 is rotatably supported by the reel body 3 via a drive shaft 10a shown in FIG. 2.

The rotation transmission mechanism 10 shown in FIG. 2 is a mechanism which transmits the rotation of the handle 7 to the spool shaft 11. The rotation transmission mechanism 10 is arranged between the second side cover 35 and the second side plate 31b. The rotation transmission mechanism 10 has the drive shaft 10a which rotates integrally with the handle 7, a drive gear 10b which rotates integrally with the drive shaft 10a, and a pinion gear 10c which meshes with the drive gear 10b.

When the handle 7 rotates, the drive shaft 10a, the drive gear 10b, and the pinion gear 10c rotate. The spool shaft 11 is inserted into the inner peripheral part of the pinion gear 10c. The rotation from the pinion gear 10c to the spool shaft 11 is transmitted via a clutch mechanism (not shown).

As shown in FIG. 2, the spool shaft 11 is rotatably supported by the reel body 3. For example, the spool shaft 11 is rotatably supported by the shaft support 34 of the first side cover 33 and the second side plate 31b via the bearing 37 and a bearing 39. The spool 5 is attached to the spool shaft 11.

The spool braking device 13 brakes the spool 5, which rotates integrally with the spool shaft 11, using centrifugal force. As shown in FIG. 2, the spool braking device 13 includes the brake drum 51 and a rotation structure 53.

The brake drum 51 is positioned alongside the spool 5 in the axial direction. The brake drum 51 is arranged outside of the shaft support 34 of the first side cover 33 in the radial direction. The brake drum 51 is arranged radially inside of a brake shoe 67 (described below). The brake drum 51 is disposed in the reel body 3. For example, the brake drum 51 is attached to the shaft support 34 of the first side cover 33 via a moving mechanism 55.

Figure 3:
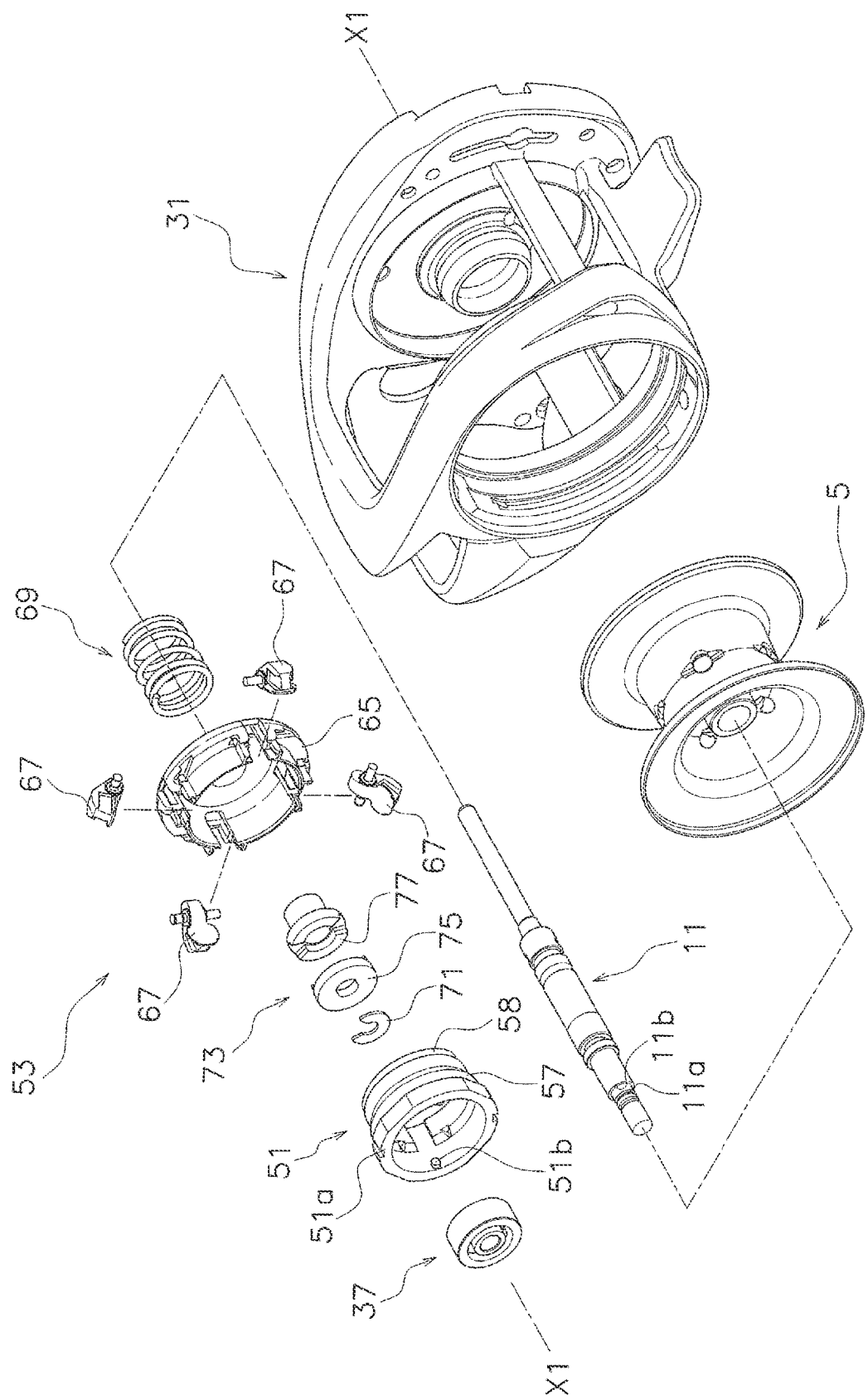
FIG. 3 is a perspective view of a frame, a spool, a spool shaft, and a rotation structure.
Figure 4:
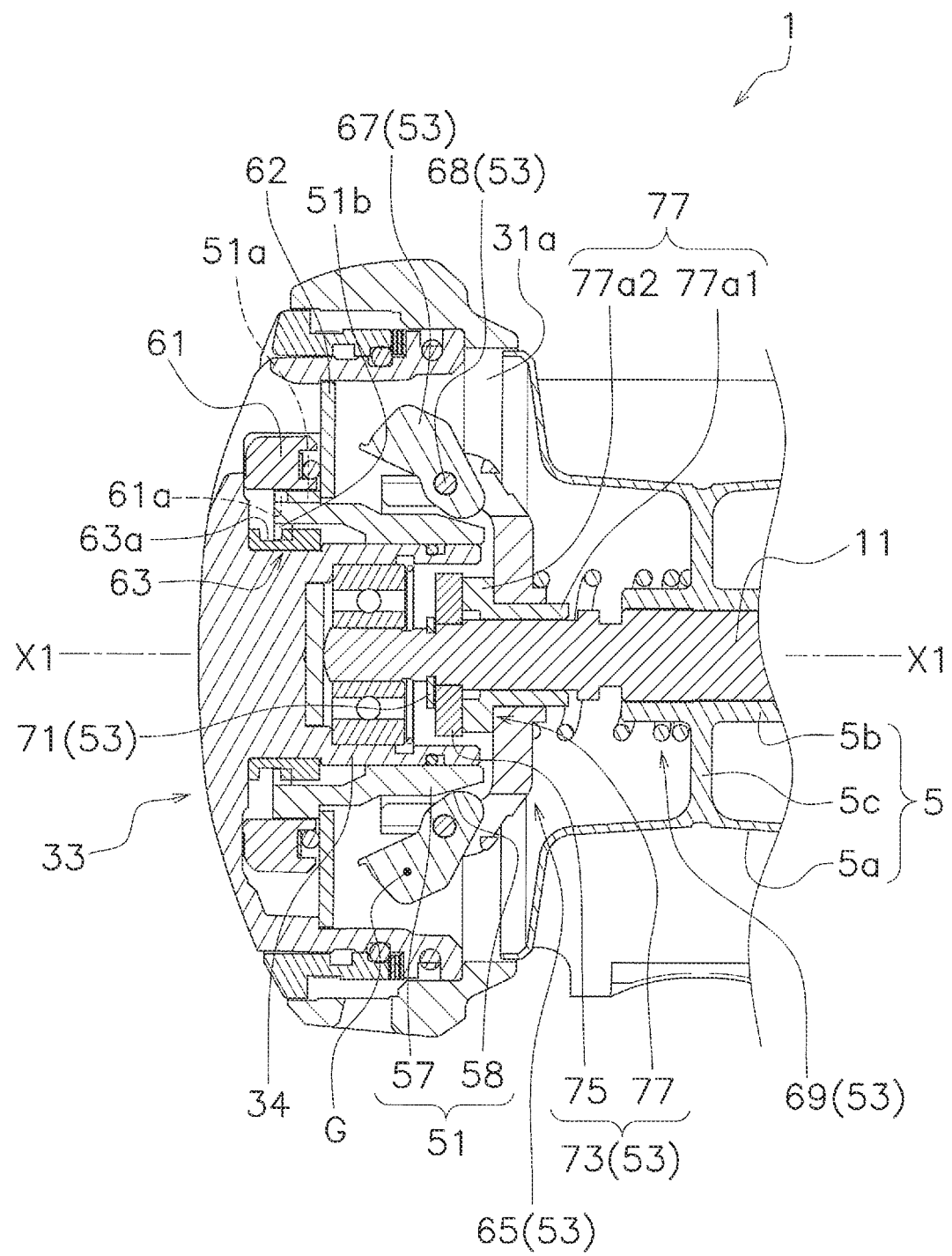
FIG. 4 is an enlarged cross-sectional view of the vicinity of the rotation structure.

As shown in FIGS. 3 and 4, the brake drum 51 includes a drum body 57 and a tapered surface 58. The drum body 57 is formed in a cylindrical shape. The drum body 57 is disposed on the outer peripheral surface of the shaft support 34. The tapered surface 58 is formed at one end of the drum body 57. For example, the tapered surface 58 is formed on the outer peripheral surface of one end of the drum body 57. The tapered surface 58 is reduced in diameter towards the spool 5. In other words, the outer diameter of the tapered surface 58 decreases as approaching the spool 5.

As shown in FIG. 2, the brake drum 51 is configured to be movable in the axial direction by the moving mechanism 55. The moving mechanism 55 is mounted on the first side cover 33. The moving mechanism 55 is arranged between the first side cover 33 and the first side plate 31a. The moving mechanism 55 has the operating member 61 and a drum cam 63.

The operating member 61 is operated when the brake drum 51 is moved in the axial direction. The operating member 61 is attached so as to be rotatable with respect to the reel body 3, for example, the shaft support 34 of the first side cover 33. The operating member 61 has an annular shape. The operating member 61 is arranged outside of the brake drum 51 in the radial direction. The operating member 61 is axially positioned by a lid member 62 that is attached to the first side cover 33. The operating member 61 engages with the brake drum 51 and the drum cam 63.

For example, as shown in FIGS. 3 and 4, grooves 51a, extending in the axial direction, are formed on the outer peripheral surface of the brake drum 51. First convex portions 61a, protruding radially inward, are formed on the inner peripheral surface of the operating member 61. The first convex portions 61a engage with the grooves 51a of the brake drum 51. As a result, the operating member 61 and the brake drum 51 rotate integrally, and the brake drum 51 moves in the axial direction with respect to the operating member 61.

As shown in FIG. 4, the drum cam 63 moves the brake drum 51 in the axial direction. The drum cam 63 is provided on the outer peripheral surface of the shaft support 34. For example, the drum cam 63 is arranged between the shaft support 34 and the brake drum 51 in the radial direction. The drum cam 63 engages with the brake drum 51 and moves the brake drum 51 in the axial direction.

For example, as shown in FIG. 3, second convex portions 51b, protruding radially inward, are formed on the inner peripheral surface of the brake drum 51. As shown in FIG. 4, a helical groove 63a, extending in the circumferential direction and the axial direction, is formed on the outer peripheral surface of the drum cam 63. The second convex portions 51b engage with the helical groove 63a. In this state, when the operating member 61 and the brake drum 51 integrally rotate, the second convex portions 51b move along the helical groove 63a. As a result, the brake drum 51 moves in the axial direction while rotating in the circumferential direction.

As shown in FIG. 2, the rotation structure 53 is arranged between the spool 5 and the brake drum 51 in the axial direction. The rotation structure 53 rotates in accordance with the spool shaft 11. As shown in FIG. 3, the rotation structure 53 includes a shoe support 65, a plurality (four, for example) of brake shoes 67, and a coil spring 69 (one example of biasing member). The rotation structure 53 further includes a stopper ring 71 (one example of positioning member). The rotation structure 53 further includes a cam mechanism 73.

The shoe support 65 swingably supports the brake shoes 67. The shoe support 65 rotates in accordance with the spool shaft 11. For example, the shoe support 65 rotates with the spool shaft 11 via the cam mechanism 73. The shoe support 65 is formed in a disc shape. For example, the shoe support 65 is formed in a bowl shape.

As shown in FIG. 4, the shoe support 65 is arranged between the stopper ring 71 and the coil spring 69 in the axial direction. For example, the shoe support 65 is arranged between the cam mechanism 73 and the coil spring 69 in the axial direction. In detail, the shoe support 65 is arranged between a first flange 77a2 (described below) of a second cam section 77 and the coil spring 69 in the axial direction.

The shoe support 65 is arranged radially outside of the spool shaft 11. The shoe support 65 is configured to be axially movable with respect to the brake drum 51. For example, the shoe support 65 axially moves with the second cam section 77 with respect to the brake drum 51. The shoe support 65 is attached to a first cylindrical part 77a1 (described below) of the second cam section 77 so as to rotate integrally with the second cam section 77. The shoe support 65 and the second cam section 77 rotate with the spool shaft 11 via a first cam section 75 (described below) of the cam mechanism 73.

As shown in FIG. 4, the plurality of brake shoes 67 are configured to be able to contact the brake drum 51. The plurality of brake shoes 67 are swingably supported by the shoe support 65. For example, each brake shoe 67 is swingably supported on the outer peripheral part of the shoe support 65 via a swing shaft 68. Each brake shoe 67 is circumferentially spaced apart from each other.

The center of gravity G of each brake shoe 67 is positioned outside the brake drum 51 in the radial direction. For example, when the shoe support 65 rotates, centrifugal force acts on the center of gravity G of each brake shoe 67, causing each brake shoe 67 to swing around the swing shaft 68. As a result, each brake shoe 67 comes in contact with the tapered surface 58 of the brake drum 51.

As shown in FIG. 4, the coil spring 69 biases the shoe support 65 towards the brake drum 51. The coil spring 69 is arranged between the spool 5 and the shoe support 65 axially in a compressed state. For example, one end of the coil spring 69 is arranged radially outside of the boss 5b of the spool 5 and comes in contact with the annular wall portion 5c of the spool 5. The other end of the coil spring 69 comes in contact with the shoe support 65.

The stopper ring 71 is used to position the shoe support 65 at an initial position. The stopper ring 71 has a C-shape. The stopper ring 71 is attached to the spool shaft 11. For example, the stopper ring 71 is attached to an annular groove 11a (see FIG. 3) of the spool shaft 11.

The cam mechanism 73, shown in FIGS. 3 and 4, guides the shoe support 65 in the axial direction away from the brake drum 51. The cam mechanism 73 has the first cam section 75 and the second cam section 77. As shown in FIG. 4, the first cam section 75 is arranged between the stopper ring 71 and the second cam section 77 in the axial direction. The first cam section 75 comes in contact with the stopper ring 71. The first cam section 75 engages with the second cam section 77.

Figure 5:
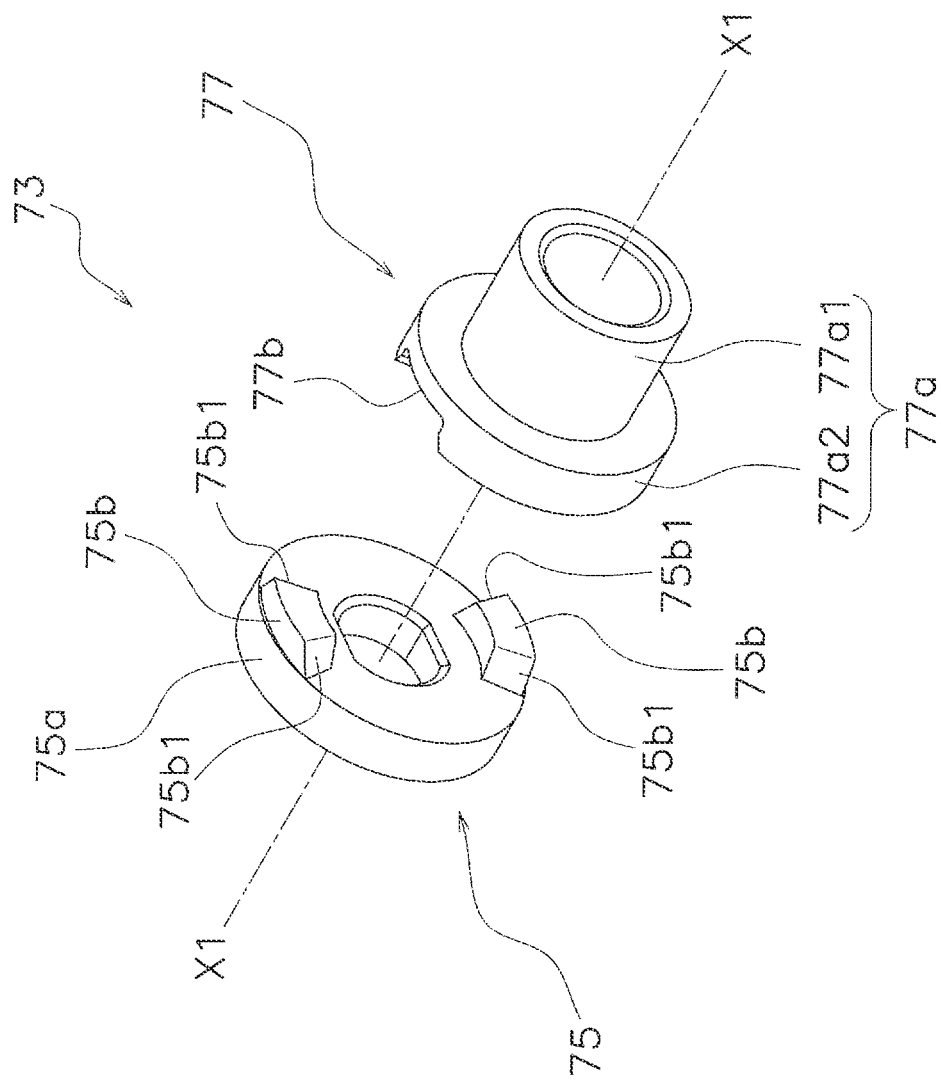
FIG. 5 is a perspective view of a cam mechanism.

As shown in FIG. 5, the first cam section 75 includes a first body 75a and a plurality (two, for example) of protrusions 75b. The first body 75a is attached to the spool shaft 11 so as to rotate integrally with the spool shaft 11. For example, the first body 75a is formed in a disc shape. The first body 75a is attached to the outer surface of the spool shaft 11 by non-circular engagement.

As a result, the first body 75a rotates integrally with the spool shaft 11. The first body 75a is arranged between a step wall 11b (see FIG. 3) of the spool shaft 11 and the stopper ring 71. With this configuration, the axial movement of the first body 75a with respect to the spool shaft 11 is restricted.

The plurality of protrusions 75b are integrally formed with the first body 75a. The plurality of protrusions 75b protrude from the first body 75a towards the shoe support 65. The plurality of protrusions 75b are spaced apart from each other in the circumferential direction. Each protrusion 75b has a pair of sloped surfaces 75b1 facing each other in the circumferential direction. The circumferential interval of the pair of sloped surfaces 75b1 decreases towards the spool 5.

As shown in FIG. 5, the second cam section 77 has a second body 77a, and a plurality (two, for example) of recesses 77b. The second body 77a is attached to the spool shaft 11 so as to rotate integrally with the shoe support 65. The second body 77a is arranged so as to face the first body 75a in the axial direction.

For example, the second body 77a has the first cylindrical part 77a1 and the first flange 77a2. The first cylindrical part 77a1 is disposed on the outer peripheral surface of the spool shaft 11. The first cylindrical part 77a1 axially moves with respect to the spool shaft 11. The shoe support 65 is fixed to the outer peripheral surface of the first cylindrical part 77a1, and the first cylindrical part 77a1 rotates integrally with the shoe support 65.

The first flange 77a2 extends radially outward from the first cylindrical part 77a1. The first flange 77a2 has an annular shape. As shown in FIG. 4, the first flange 77a2 is arranged between the shoe support 65 and the first cam section 75 (the first body 75a) in the axial direction.

As shown in FIG. 5, the plurality of recesses 77b are formed in the second body 77a. For example, the plurality of recesses 77b are formed in the first flange 77a2. The plurality of recesses 77b are spaced apart from each other in the circumferential direction.

The plurality of recesses 77b are arranged to face the plurality of protrusions 75b of the first cam section 75, respectively. The plurality of recesses 77b engage with the plurality of protrusions 75b of the first cam section 75, respectively. The wall of each recess 77b is formed along the sloped surfaces 75b1 of each protrusion 75b. The wall of each recess 77b is slidable with the sloped surfaces 75b1 of the protrusion 75b.

In the spool braking device 13 having the above-described configuration, the spool 5 and the spool shaft 11 rotate in a state in which the plurality of recesses 77b of the second cam section 77 are engaged with the plurality of protrusions 75b of the first cam section 75. In this state, the rotation of the spool shaft 11 is transmitted from the first cam section 75 to the second cam section 77 and then, transmitted from the second cam section 77 to the shoe support 65.

This causes the spool shaft 11, the cam mechanism 73 (the first cam section 75 and the second cam section 77), and the shoe support 65 to rotate. In this state, the brake shoes 67 are in contact with the tapered surface 58 of the brake drum 51, and the brake shoes 67 slide with respect to the tapered surface 58 of the brake drum 51.

Here, if the rotational speed of the spool 5 (the rotational speed of the shoe support 65) becomes high and the force of the brake shoes 67 biasing the tapered surface 58 of the brake drum 51 increases, the shoe support 65 axially moves away from the brake drum 51 due to the reaction force acting on the brake shoes 67 from the tapered surface 58 of the brake drum 51.

This causes the brake shoes 67 to contact the small diameter side of the tapered surface 58, therefore, it is possible to decrease the braking force on the spool 5. In other words, the spool braking device 13 can suitably apply a braking force to the spool 5 so as not to reduce the flying distance even when the rotational speed of the spool 5 becomes high.

Also, if the rotational speed of the spool 5 decreases from the state in which the rotational speed of the spool 5 (the rotational speed of the shoe support 65) is high, the reaction force acting on the brake shoes 67 from the tapered surface 58 of the brake drum 51 reduces, and thus, the shoe support 65 is pressed by the coil spring 69 and approaches the brake drum 51.

This causes the brake shoes 67 to contact the large diameter side of the brake drum 51, therefore, it is possible to recover the braking force on the spool 5. In other words, the spool braking device 13 can suitably apply a braking force to the spool 5 not to generate backlash even when the rotational speed of the spool 5 reduces from high speed.

(Variations)

The above-described embodiment can be modified as in the first variation below.

First Variation

Figure 6:
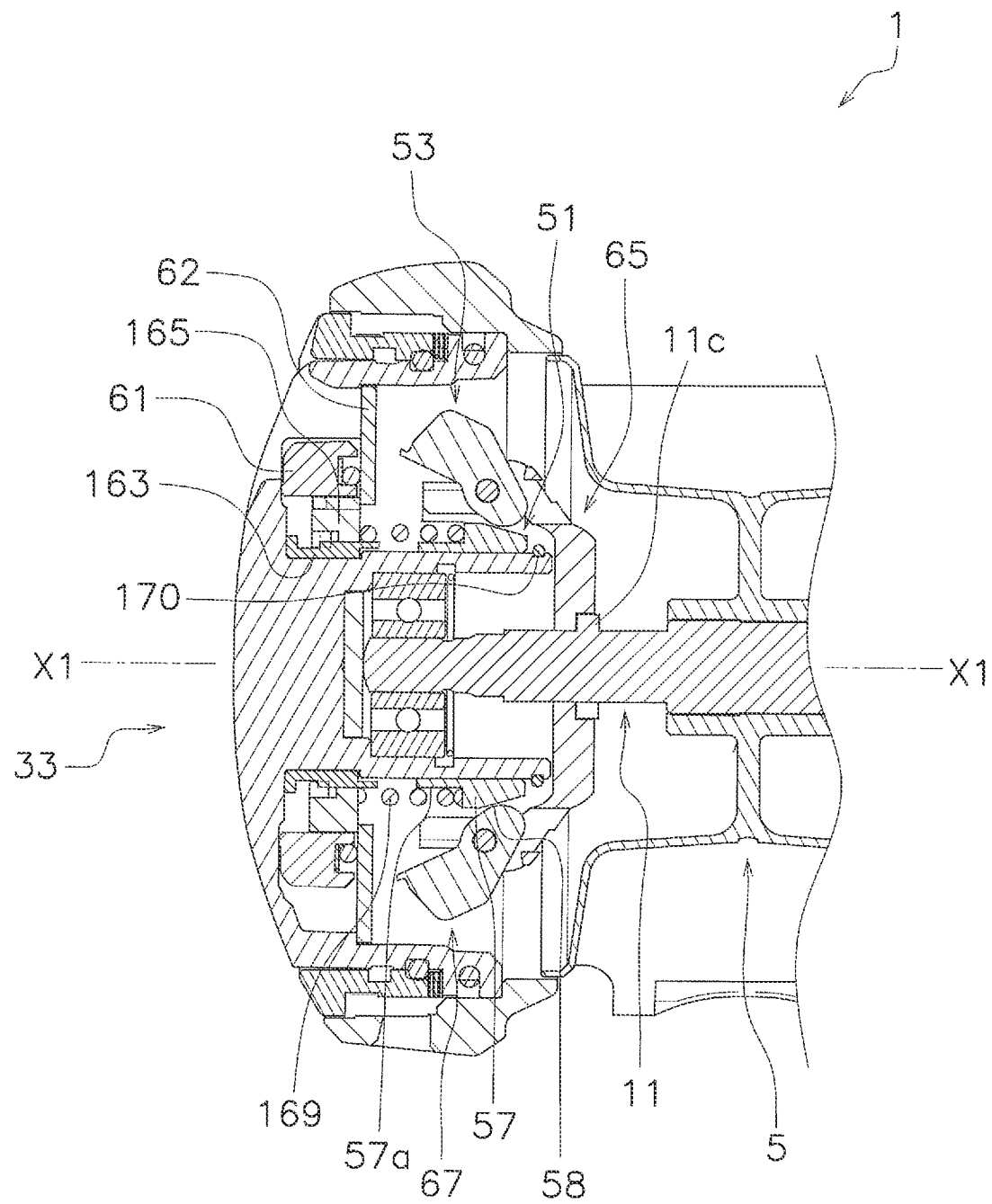
FIG. 6 is an enlarged cross-sectional view of the vicinity of a rotation structure according to a first variation.

In the above-described embodiment, an example was given of a case in which the shoe support 65 axially moves with respect to the brake drum 51. Instead of this configuration, as shown in FIG. 6, the brake drum 51 can be configured to axially move with respect to the shoe support 65.

In this case, the shoe support 65 is press-fitted into the spool shaft 11 and comes in contact with an annular convex portion 11c of the spool shaft 11. In this manner, the shoe support 65 is attached to the spool shaft 11 in an axially non-movable and non-rotatable manner. A coil spring 169

(one example of biasing member) is arranged between the brake drum 51 and the first side cover 33 in the axial direction.

For example, a step part 57*a* is formed at the other end of the drum body 57 of the brake drum 51. One end of the coil spring 169 is disposed on the outer peripheral surface of the step part 57*a*. The one end of the coil spring 169 is in contact with the wall of the step part 57*a*. The other end of the coil spring 169 is disposed outside of the shaft support 34 of the first side cover 33, for example, outside of a pushing cam 163, in the radial direction. The other end of the coil spring 169 is in contact with a pushing member 165. An O-ring 170 is arranged to restrict the brake drum 51 from slipping out of the shaft support 34 of the first side cover 33 at the tip of the shaft support 34 of the first side cover 33.

In this case, by operating the operating member 61, the pushing member 165 is axially moved by the pushing cam 163. This changes the strength of the biasing force with which the pushing member 165 biases the coil spring 169. Incidentally, the movement of the pushing member 165 is the same as the movement of the drum cam 63 of the moving mechanism 55 in the above-described embodiment.

With this configuration, the brake drum 51 moves away from the shoe support 65 when the rotational speed of the spool 5 (the rotational speed of the shoe support 65) becomes high, thereby, the brake shoes 67 can be brought into contact with the tapered surface 58 on the small diameter side. As a result, even when the rotational speed of the spool 5 becomes high, a braking force can be suitably applied to the spool 5 so as not to decrease the flying distance.

Also when the rotational speed of the spool 5 decreases from the state in which the rotational speed of the spool 5 (the rotational speed of the shoe support 65) is high, the brake drum 51 is biased by the coil spring 169 and approaches the shoe support 65, thereby, the brake shoes 67 can be brought into contact with the brake drum 51 on the large diameter side. As a result, even when the rotational speed of the spool 5 decreases from high speed, a braking force can be suitably applied to the spool 5 so as not to generate backlash.

Second Variation

Figure 7:
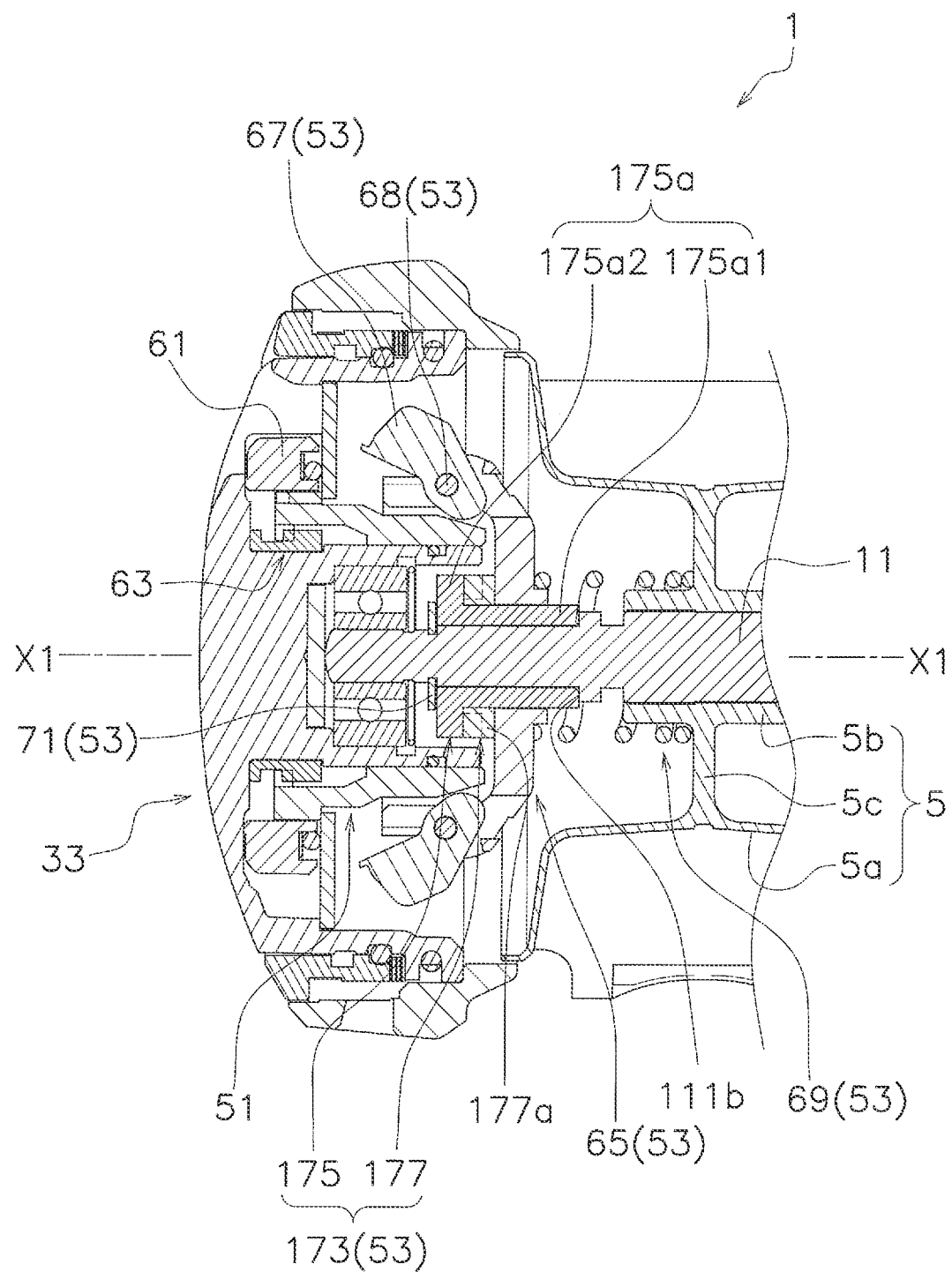
FIG. 7 is an enlarged cross-sectional view of the vicinity of a rotation structure according to a second variation.

The cam mechanism 73 in the above-described embodiment can be configured as follows. As shown in FIG. 7, a cam mechanism 173 includes a first cam section 175 and a second cam section 177. The first cam section 175 includes a cylindrical first body 175*a*, and the plurality (two, for example) of protrusions 75*b* (see FIG. 5) provided on the outer peripheral part of the cylindrical first body 175*a*. The first body 175*a* has a second cylindrical part 175*a*1 (one example of cylindrical part) and a second flange 175*a*2 (one example of flange).

The second cylindrical part 175*a*1 is formed in a cylindrical shape. The inner surface of the second cylindrical part 175*a*1 engages with the outer surface of the spool shaft 11 by non-circular engagement. As a result, the second cylindrical part 175*a*1 rotates integrally with the spool shaft 11. The second cylindrical part 175*a*1 is arranged between a step wall 111*b* of the spool shaft 11 and the stopper ring 71. With this configuration, the axial movement of the second cylindrical part 175*a*1 with respect to the spool shaft 11 is restricted.

The second flange 175*a*2 extends radially outward from the second cylindrical part 175*a*1. The second flange 175*a*2 is integrally formed with the second cylindrical part 175*a*1. The second flange 175*a*2 is formed in an annular shape. The plurality of protrusions 75*b* (see FIG. 5) are provided on the second flange 175*a*2. The plurality of protrusions 75*b* protrude from the second flange 175*a*2 in the axial direction.

The second cam section 177 includes a second body 177*a* and the plurality (two, for example) of recesses 77*b* (see FIG. 5). The second body 177*a* is attached to the shoe support 65 so as to rotate integrally with the shoe support 65. The second body 177*a* can be integrally formed with the shoe support 65.

The second body 177*a* is formed in a cylindrical shape. The second body 177*a* is disposed on the outer peripheral surface of the second cylindrical part 175*a*1 between the second flange 175*a* and the shoe support 65 in the axial direction. The second body 177*a* rotates relative to the second cylindrical part 175*a*1. The plurality of recesses 77*b* (see FIG. 5) are provided to the second body 177*a*. The plurality of recesses 77*b* engage with the plurality of protrusions 75*b*, respectively.

In this configuration, the cam receiving portion 177 (the second body 177*a*) is disposed on the outer peripheral surface of the second cylindrical part 175*a*1 between the second flange 175*a*2 of the first cam section 175 and the shoe support 65 in the axial direction. In this state, the second cam section 177 moves closer to or away from the first cam section 175 along the outer peripheral surface of the second cylindrical part 175*a*1. This allows the second cam section 177 to move stably in the axial direction.

Third Variation

Figure 8:
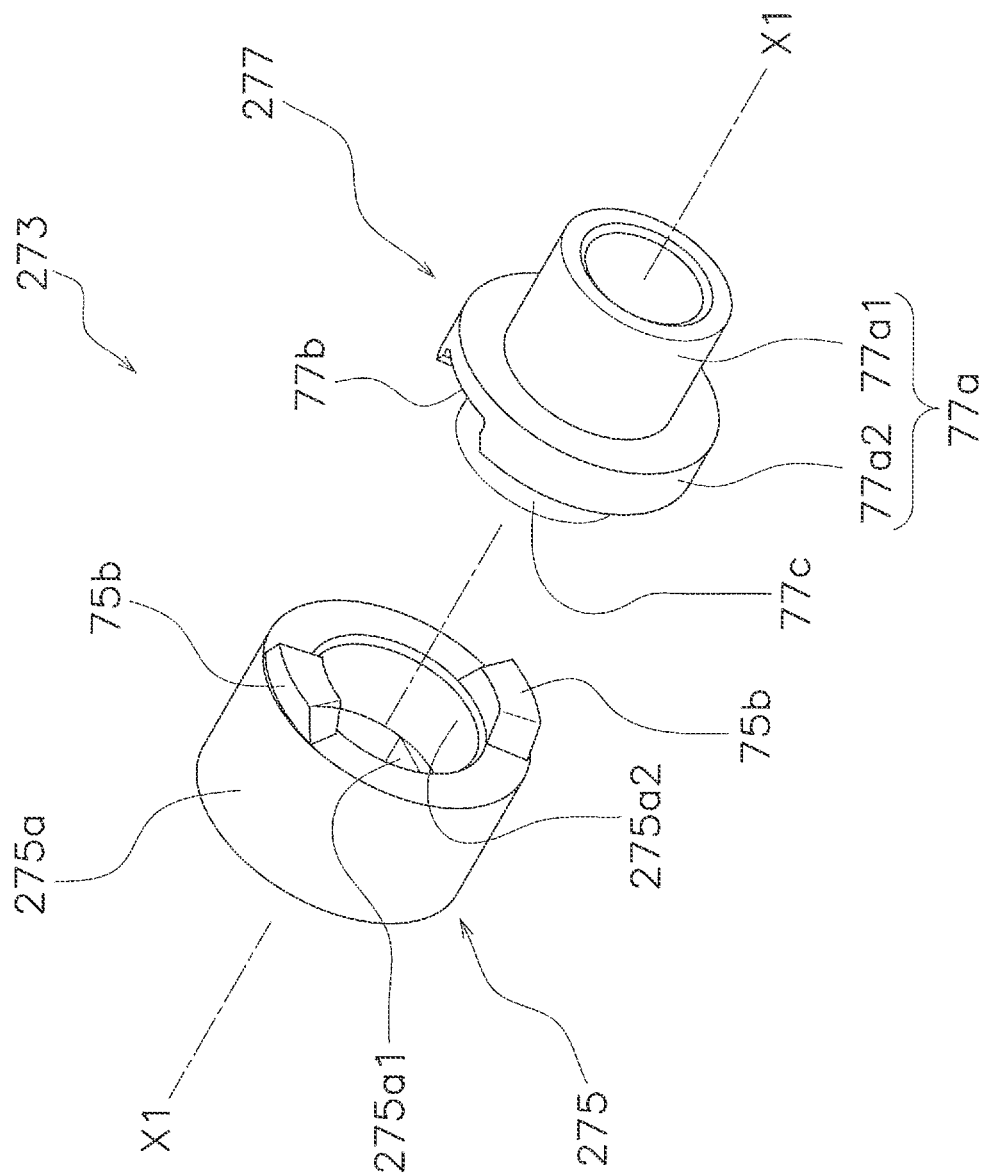
FIG. 8 is a perspective view of a cam mechanism according to a third variation.

The cam mechanism 73 in the above-described embodiment can be configured as follows. As shown in FIG. 8, a cam mechanism 273 includes a first cam section 275 and a second cam section 277. The first cam section 275 has a cylindrical first body 275*a* and the plurality (two, for example) of protrusions 75*b* provided on the outer peripheral part of the cylindrical first body 275*a*. The first body 275*a* rotates integrally with the spool shaft 11 and is restricted from axial movement relative to the spool shaft 11.

The first body 275*a* includes a non-circular hole 275*a*1 and a circular hole 275*a*2. The non-circular hole 275*a*1 engages with the outer peripheral surface of the spool shaft 11 so as not to be rotatable relative to the outer peripheral surface of the spool shaft 11. In this manner, the first body 275*a* rotates integrally with the spool shaft 11. That is, the first cam section 275 rotates integrally with the spool shaft 11.

The circular hole 275*a*2 is provided so as to communicate with the non-circular hole 275*a*1. A boss 77*c* (described below) of the second cam section 277 is disposed at the circular hole 275*a*2. The plurality of protrusions 75*b* are provided to the first body 275*a*. The plurality of protrusions 75*b* protrude in the axial direction from the first body 275*a*.

The second cam section 277 includes the second body 77*a*, the plurality (two, for example) of recesses 77*b*, and the boss 77*c*. The configuration of the second body 77*a* and the configuration of the plurality of recesses 77*b* are the same as the configurations of the above-described embodiment. For the same configurations as in the previous embodiment, the description of the above-described embodiment applies.

The boss 77*c* protrudes from the second body 77*a*. For example, the boss 77*c* extends in the axial direction from the first cylindrical part 77*a*1. The boss 77*c* and the first cylindrical part 77*a*1 are disposed on the outer peripheral surface of the spool shaft 11. The boss 77*c* and the first cylindrical part 77*a*1 rotate relative to the spool shaft 11 and axially move with respect to the spool shaft 11.

The boss 77*c* is disposed in the circular hole 275*a*2 of the first cam section 275. For example, in a state in which the tip of the boss 77*c* is disposed in the circular hole 275*a*2, the tip of the boss 77c is located between the inner peripheral surface of the circular hole 275a2 and the outer peripheral surface of the spool shaft 11 in the radial direction.

In this configuration, in a state in which the tip of the boss 77c of the second cam section 277 is disposed in the circular hole 275a2 of the first cam section 275, the second cam section 277 moves closer to or away from the first cam section 275 along the spool shaft 11. This allows the second cam section 277 to move stably in the axial direction.

Fourth Variation

Figure 9:
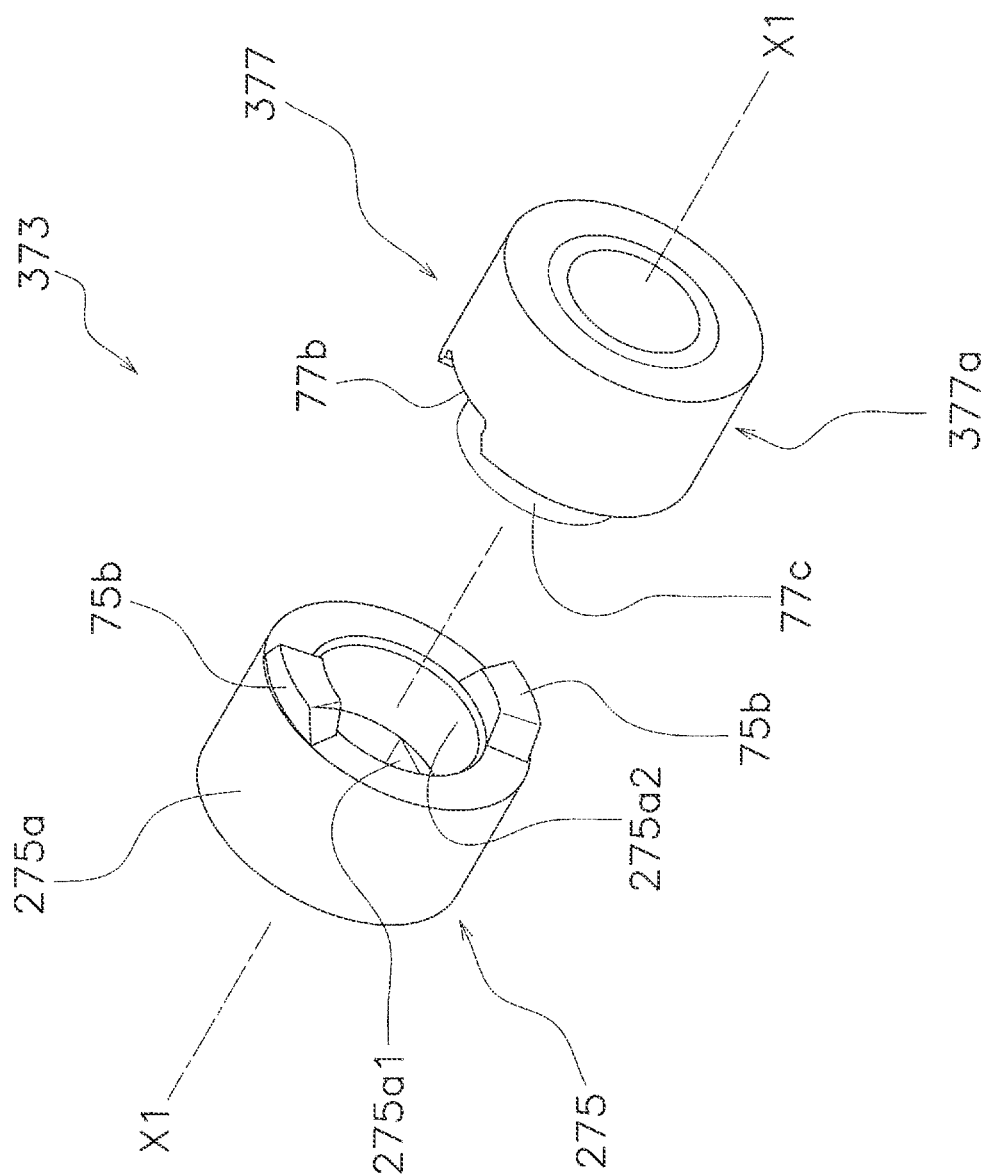
FIG. 9 is a perspective view of a cam mechanism according to a fourth variation.

The cam mechanism 73 in the above-described embodiment can be configured as follows. As shown in FIG. 9, a cam mechanism 373 includes the first cam section 275 and a second cam section 377. The configuration of the first cam section 275 is the same as the configuration in the third variation. For the same configurations as in the third variation, the description of the third variation applies.

The second cam section 377 includes a second body 377a, the plurality (two, for example) of recesses 77b, and the boss 77c. The second body 377a is formed in a cylindrical shape. The second body 377a is disposed on the outer peripheral surface of the spool shaft 11. The shoe support 65 shown in FIGS. 3 and 4 is attached to the outer peripheral surface of the second body 377a. The shoe support 65 rotates integrally with the second body 377a.

The plurality of recesses 77b are provided on the outer peripheral part of the second body 377a. The boss 77c protrudes from the second body 377a. The boss 77c is disposed on the outer peripheral surface of the spool 11. The second body 377a and the boss 77c rotate relative to the spool shaft 11 and axially move with respect to the spool shaft 11.

In this configuration, as in the third variation, in a state in which the tip of the boss 77c of the second cam section 377 is disposed in the circular hole 275a2 of the first cam section 275, the second cam section 377 moves closer to or away from the first cam section 275 along the spool shaft 11. This allows the second cam section 377 to move stably in the axial direction.

REFERENCE SIGNS LIST

1 Dual bearing reel
3 Reel body
5 Spool
11 Spool shaft
13 Spool braking device
51 Brake drum
53 Rotation Structure
57 Drum body
58 Tapered surface
65 Shoe support
67 Brake shoe
69, 169 Coil spring
71 Stopper ring
73 Cam mechanism
75, 175, 275 First cam section
75a, 175a, 275a First body
75b Protrusion
75b1 Sloped surface
77, 177, 277, 377 Second cam section
77a, 177a, 277a, 377a Second body
77b Recess
77c Boss
175a1 Second cylindrical part
175a2 Second flange
275a1 Non-circular hole
275a2 Circular hole
G Center of gravity of brake shoe
X1 Rotation axial center

What is claimed is:

1. A spool braking device for a dual bearing reel configured to brake a spool using centrifugal force, the spool rotating integrally with a spool shaft that is rotatably supported by a reel body, the spool braking device comprising:
a brake drum disposed in the reel body and positioned alongside the spool in an axial direction in which a rotation axial center of the spool shaft extends, the brake drum including a tapered surface whose diameter is reduced towards the spool; and
a rotation structure arranged between the spool and the brake drum in the axial direction,
the rotation structure including
a support that rotates in accordance with the spool shaft,
a brake shoe swingably supported by the support, the brake shoe having a center of gravity arranged outside of the brake drum in a radial direction away from the rotation axial center, the brake shoe configured to contact the tapered surface of the brake drum, and
a biasing member that biases one of the support or the brake drum towards the other one of the support or the brake drum, and
the one of the support or the brake drum being movable in the axial direction with respect to the other one of the support or the brake drum in accordance with a balance of axial engaging force generated by the biasing member and axial separating force generated by the brake shoe acting on the brake drum in accordance with a rotational speed of the rotation structure such that one of the support or the brake drum is configured and arranged to separate from the other one of the support or the brake drum in the axial direction as the rotational speed of the rotation structure increases.

2. The spool braking device according to claim 1, wherein the rotation structure further includes a cam mechanism configured to guide the support apart from the brake drum in the axial direction, the support being axially movable with respect to the brake drum, and
the support is arranged between the cam mechanism and the biasing member in the axial direction.

3. The spool braking device according to claim 2, wherein the cam mechanism includes
a first cam section having a first body rotating integrally with the spool shaft, and a protrusion protruding from the first body towards the support, and
a second cam section having a second body rotating integrally with the support, and a recess disposed in the second body and engaged with the protrusion,
the protrusion has a pair of sloped surfaces facing each other in a circumferential direction around the rotation axial center, and
an interval in the circumferential direction between the pair of sloped surfaces decreases towards the spool in the axial direction.

4. The spool braking device according to claim 2, wherein the cam mechanism includes
a first cam section having a first body rotating integrally with the spool shaft, and a protrusion protruding from the first body towards the support, and
a second cam section having a second body arranged to face the first body in the axial direction and rotating integrally with the support, and a recess disposed in the second body and engaged with the protrusion.

5. The spool braking device according to claim 2, wherein the cam mechanism includes a first cam section having a first body and a protrusion, the first body having a cylindrical part rotating integrally with the spool shaft and a flange extending radially outward from the cylindrical part, the protrusion protruding from the flange towards the support, and a second cam section having a second body and a recess, the second body being disposed on an outer peripheral surface of the cylindrical part between the flange and the support in the axial direction and rotating integrally with the support, the recess being disposed in the second body and engaged with the protrusion.

6. The spool braking device according to claim 2, wherein the cam mechanism includes a first cam section having a first body rotating integrally with the spool shaft, and a protrusion protruding from the first body towards the support, and a second cam section having a second body rotating integrally with the support, a recess disposed in the second body and engaged with the protrusion, and a boss protruding from the second body, the first body has a non-circular hole engaged in a non-rotatable manner relative to an outer peripheral surface of the spool shaft, and a circular hole communicating with the non-circular hole, and the boss is arranged between the spool shaft and the circular hole in the radial direction.

7. The spool braking device according to claim 1, wherein the brake drum includes a drum body, and the tapered surface of the brake drum is formed on an outer peripheral surface of the brake drum at an end thereof.

8. The spool braking device according to claim 1, wherein the brake drum is disposed radially inside the brake shoe.

9. The spool braking device according to claim 1, wherein the biasing member is disposed axially between the spool and the support in a compressed state.

10. The spool braking device according to claim 1, wherein the rotation structure further includes a positioning member configured to position the support that is axially movable with respect to the brake drum at an initial position, and the support is arranged between the positioning member and the biasing member in the axial direction.

* * * * *